Nov. 30, 1965  W. STELZER  3,220,188
COMPOUND PRESSURE PROPORTIONING MASTER CYLINDER
Filed June 18, 1964
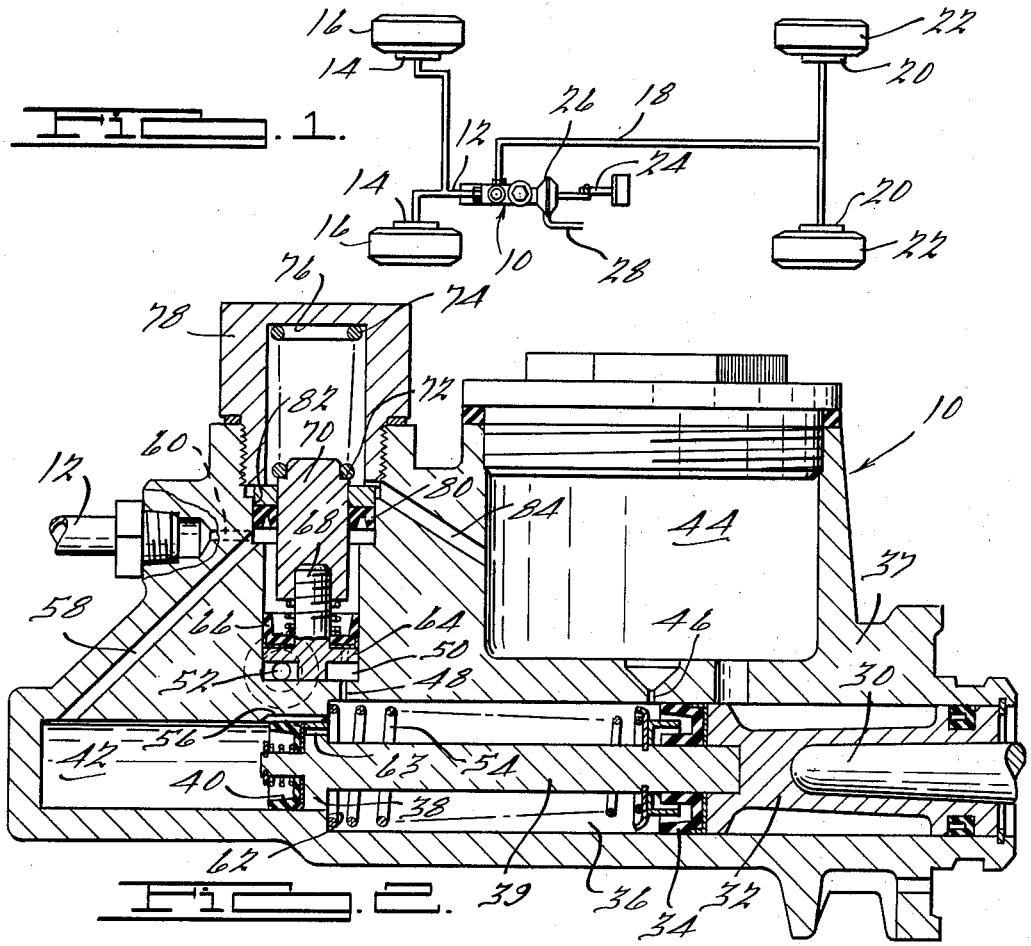
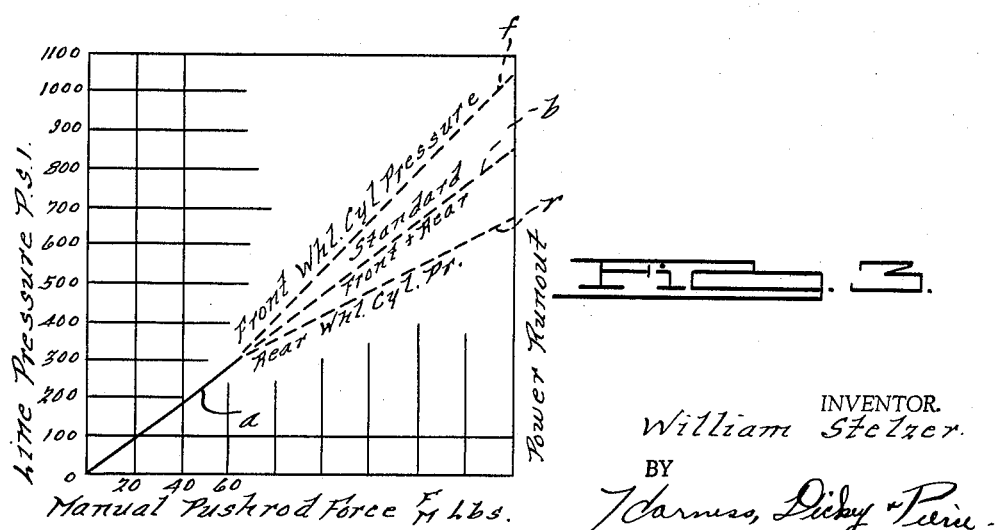
INVENTOR.
William Stelzer.
BY
ATTORNEYS.

ured Nov. 30, 1965

United States Patent Office 3,220,188
Patented Nov. 30, 1965

3,220,188
COMPOUND PRESSURE PROPORTIONING MASTER CYLINDER
William Stelzer, Bloomfield Hills, Mich., assignor to Kelsey-Hayes Company, Romulus, Mich., a corporation of Delaware
Filed June 18, 1964, Ser. No. 376,078
7 Claims. (Cl. 60—54.5)

This invention relates to vehicle hydraulic brake systems, and particularly to a master cylinder for such a system which is operable to proportion the fluid pressures between the front and rear brakes in accordance with varying conditions of brake application.

It is an object of the present invention to provide a master cylinder of the above character which is adapted to deliver fluid to the front and rear brakes of the vehicle at varying pressures when the brakes are applied with a force in excess of the predetermined amount.

It is another object of the present invention to provide a master cylinder operable to compensate for the weight transfer of the vehicle between the front and rear wheels experienced during rapid deceleration by increasing the pressure of the fluid at the front wheel brake cylinders and decreasing the pressure at the rear wheel brake cylinders.

It is an object of the present invention to provide a master cylinder operable to displace fluid to both the front and rear wheel brakes at equal pressures during an initial portion of the brake application and thereafter to increase the ratio of front wheel brake cylinder to rear wheel brake cylinder in accordance with the force with which the brakes are applied.

It is another object of the present invention to provide a master cylinder which is operable to displace a relatively large volume of fluid to the brake cylinders for a given amount of pedal travel during initial brake application to bring the brake shoes into contact with the drum, disk or other member to be braked, and which is effective to deliver a reduced volume of fluid at an increased pressure for the same pedal travel during a subsequent portion of the brake application.

It is still another object of the present invention to provide a compound master cylinder for separately displacing fluid to the front and rear brakes of the wheels in which the loss of fluid pressure to the rear brakes will not affect pressurization of the front brakes, thereby enhancing the safety of the brake system.

It is another object of the above invention to provide a master cylinder of the above character which is simple in construction, reliable in operation, and inexpensive to fabricate.

These and other objects of the present invention will be apparent from the following detailed description taken in conjunction with the accompanying drawings, wherein:

FIGURE 1 diagrammatically illustrates a braking system incorporating the master cylinder of the present invention;

FIGURE 2 is a vertical sectional view of the master cylinder of the present invention illustrated in FIGURE 1; and FIGURE 3 is a graph showing the braking pressures at the front and rear wheels as a function of the input braking force.

As is well known in the vehicle brake industry, the application of the brakes in a passenger car produces a couple about the center of mass of the car and transfers a portion of the vehicle weight from the rear wheels to the front wheels. The greater the rate of deceleration, the greater the weight transfer becomes. Under such dynamic conditions the capacity of the front wheels to apply braking effort without skidding is increased and the capacity of the rear wheels to apply braking effort without skidding is decreased. For this reason various devices have been proposed to re-proportion the ratio of front and rear wheel braking effort during conditions of relatively high rates of deceleration. The master cylinder disclosed herein is designed to accomplish this general function and utilizes the applied brake pressure as a guide to deceleration. Under most conditions of road adhesion applied brake pressure will be proportional to deceleration and the use of applied brake effort or pressure to determine when the ratio of braking effort delivered by front and rear wheels should be adjusted, is believed to be entirely practical.

Referring now to FIGURE 1, this view will be seen to illustrate a typical brake system in which the master cylinder 10 is shown as being connected hydraulically through a conduit 12 to a pair of brake cylinders 14 of the vehicle front wheels 16. The master cylinder 10 is connected through a separate fitting and conduit 18 to a pair of brake cylinders 20 of the vehicle's rear wheels 22. The brakes are applied through the usual pedal 24 which operates a power booster 26 receiving its motive force through a conduit 28 adapted to be connected to the inlet manifold (not shown) of the vehicle engine. The power booster 26, in turn, actuates the master cylinder 10. The use of a power booster with the master cylinder 10 is optional.

Referring now to FIGURE 2, a push rod 30, which is operated by the power booster 26 (or by manual force), is illustrated as being received within a first piston 32. The piston 32 carries a seal 34 at its forward end which slidably seals against the wall of a bore or chamber 36 formed in a master cylinder housing 37. A second piston 38 is connected to the piston 32 through a rod portion 39 integrally formed therewith for concurrent movement with the piston 32. The second piston 38 carries a seal 40 which slidably seals against the wall of a bore or chamber 42 formed in the housing 37 coaxially with and contiguous to the bore 36. The housing 37 is also formed with a reservoir 44 which communicates with the bore 36 through the usual compensating port 46. Upon forward fluid displacing movement of the piston 32 the compensating port 46 is closed off and fluid is displaced from the chamber 36 through a restricted passage 48 at the end of the bore 36 opposite to the compensating port 46. The passage 48 leads to the lower end of a bore 50, also formed in the housing 37. The lower end of the bore 50 is also connected to an outlet port 52 which is, in turn, connected to the conduit 18 leading to the rear brake cylinders 20. Accordingly, a constantly open fluid path is provided for the flow of brake fluid from the piston 32 to the rear brakes.

A light-weight return spring 54 is positioned in the bore 36 to bias the two pistons 32 and 38 to the positions illustrated which are their normally retracted positions. With the piston 38 in this position, a compensating slot 56 formed in the right hand end of the bore 42 provides a path for the direct flow of fluid from the bore 42 to the bore 36 and the compensating port 46 provides communication from the bore 36 to the reservoir 44. Thus, when the brakes are released the bores 42 and 36 are both vented to the reservoir which is at atmospheric pressure.

When the brakes are applied the seal 40 moves past the slot 56 and fluid within the bore 42 will be displaced through a housing passage 58 to the upper end of the bore 50. From this location the fluid is free to flow through a passage 60 leading to the conduit 12 connected to the front brakes. Accordingly, a continuously open path is provided for the flow of fluid from the bore 42 to the front brake cylinders 14.

It will be seen that the bore 42 and the piston 38 operable therein are of a smaller diameter than the bore 36 and the piston 32. An annular shoulder 62 is formed in the housing 37 between the bores 42 and 36. It will be apparent that the effective area of the piston 32, as far as its fluid displacing capabilities is concerned, equals the area of the annual shoulder 62. The forward end of the bore 36 is open to the piston 38, and the piston 38 moves with piston 32. Thus, while the piston 32 and its seal 34 are attempting to compress the fluid within the bore 36, the piston 38, by its movement, is permitting the fluid within the bore 36 to escape to the right-hand end of the bore 42. Accordingly, the cross-sectional area of the bore 42 must be subtracted from the cross-sectional area of the bore 36 in order to arrive at the true or effective fluid displacing cross-sectional area of piston 32.

During initial brake application it is desired that the front and rear brake cylinders 14 and 20, respectively, be pressurized equally. This means that the pressures produced in the bores 42 and 36 must be the same during this preliminary portion of the brake application. The master cylinder shown herein is designed to accomplish this purpose. The effective area of piston 32 is selected so that it will tend to elevate the pressure within the chamber 36 to a given level slightly prior to the time the pressure in chamber 42 will be raised to that level. In this connection it is significant to note that this does not necessarily mean that the effective area of piston 32 is larger than the area of piston 38, for the reason that the rear brake cylinders 20 served by the piston 32 are ordinarily smaller than the front brake cylinders served by the piston 38. Despite this tendency, however, differential pressure betwen the bores 36 and 42 is equalized by the flow of fluid from the bore 36 to the bore 42 past the piston 38 and its seal 40. This is accomplished by the flow of fluid through passages 63 and between the seal 40 and the wall of the bore 42. The seal 40 is undirectionally acting; that is, it will permit flow of fluid past it in one direction, but will prevent the reverse flow of fluid. The detailed structural features of such a seal are well known in the art, examples thereof being completely described in Dick, U.S. Patent No. 1,967,664 of July 24, 1934 and Heidloff, U.S. Patent No. 2,118,604 of May 24, 1938.

An equalized pressure condition will continue to prevail in the chambers 36 and 42 until the pressure reaches a predetermined level. Once the brake pressure prevailing in the chambers 36 and 42 has reached such predetermined level, the master cylinder of the present invention is designed to modulate the pressures in said chambers to cause fluid to be delivered to the front and rear brake cylinders at different pressures. The pressure modulating mechanism for accomplishing this function includes a pressure modulating piston 64 carrying a seal 66 slidably sealing engageable with the wall of the bore 50. The piston 64 and its seal 66 are of a unidirectionally acting type as described in connection with the piston 38 and seal 40. Accordingly, fluid is free to flow from the lower end of the bore 50 past piston 64 to the upper end of the bore 50 when fluid in the lower end of the bore 50 is at a higher pressure. The piston 64 is formed with a threaded stud portion 68 threaded into one end of a plunger or rod 70 of circular cylindrical outer peripheral shape. The plunger 70 is arranged co-axially with respect to the piston 64 and has a diameter somewhat less than the piston 64. The end of the plunger 70 opposite from the piston 64 is provided with an annular shoulder 72 against which one end of a coil spring 74 seats. The opposite end of the spring 74 seats against an end wall 76 formed in a closure member 78 threaded into a sealed opening in the housing 37. A seal 80 is provided between the plunger 70 and a counterbore 82 in the upper end of the bore 50 to prevent passage of fluid thereby. However, should fluid escape past the seal 80, it is free to return to the reservoir 44 by a drain pasage 84.

From the foregoing it will be apparent that the fluid pressure delivered to the front brake cliinders 14 will also exist in the upper end of the bore 50 and tend to bias the piston 64 downwardly. This fluid pressure is assisted by the force of the spring 74. However, it is to be noted that fluid pressure within the upper end of the bore 50 acts against the piston 64 only over an effective area equal to the diameter of the bore 50 less the diameter of the plunger 70. Accordingly, the force it exerts will be less than the opposing force exerted against the bottom of the piston 64 by fluid in the lower end of the bore 50. However, the combined force of the spring 76 (which is initially constant) and the force applied to the piston 64 by fluid in the upper end of the bore 50 are greater than the force applied to the piston in the lower end of the bore 64 acting against the entire cross-sectional area of the piston 64, until such time as the pressure reaches a predetermined level as determined by the relative areas of the piston 64 and the strength of the spring 74. Thus, during an initial or low pressure brake application, the piston 64 does not move from the position illustrated. When the predetermined pressure level is reached, the spring 74 will begin to yield and the piston 64 will move upwardly. The particular pressure at which the piston 64 will yield is selected in accordance with the specific design objectives sought to be realized. In the specific embodiment illustrated, however, the piston begins to yield at 300 p.s.i., as indicated in the graph of FIG. 3.

As the piston 64 begins to move upwardly it will assist the piston 38 in displacing fluid to the front brake cylinders 14, thereby increasing the pressurization of fluid at the front brake cylinders. At the same time the piston 64 tends to relieve the pressure which the piston 32 is attempting to build up within the rear brake cylinders 20. Accordingly, the movement of piston 64 from the position illustrated in FIG. 2 results in the pressurization of the rear brake cylinders 20 at a lower rate than the pressurization of the front brake cylinders 14.

It is to be appreciated that once the piston 64 begins to move, a greater movement of the pistons 32 and 38 (and thus of the brake pedal 24) will be required to produce a given increase in the fluid pressures prevailing in the front and rear brake cylinders. However, the force with which the pedal will have to be moved to produce such pressures is decreased. Stated in other terms, the application of a given unit pressure by the push rod 30 will produce a greater line pressure than was previously the case. Thus the movement of the piston 64 produces a mechanical or hydraulic advantage.

When the force on the brake pedal 24 is released, the return spring 54 will return the pistons 32 and 38 to the positions illustrated and hydraulic fluid will flow from the brake cylinders 14 and 20 and the conduits 12 and 18 back toward the bores 36 and 42. It should be pointed out that the fluid capacity of the bore 36 should not be excessively greater than the capacity of the bore 42 for the reason that when the brakes are released the pressure within the bore 42 will not be completely relieved until the seal 40 has moved into registry with the compensating slot 56. Thus, if the effective area of piston 32 is too much greater than the effective area of piston 38 the front brakes will remain pressurized to a much greater extent than the rear brakes in the partially released condition.

FIG. 3 shows a graph illustrating the line pressures as the function of input force upon the push rod 30. It will be seen that once the input force is raised above a given level, further increases in rear brake pressure will be at a lesser rate than the increases produced in front brake pressure. This, of course, is desired since the ratio of maximum possible rear brake effort to front brake effort is greater during the higher rates of deceleration to be expected from such higher push rod forces. The master cylinder of the present invention, therefore, permits maximum utilization of both sets of brakes without premature rear wheel skid and this is accomplished while actually decreasing the pedal effort required to produce a given maximum brake application. The line *a* shows brake pressure as a function of push rod force up to the point where the pressure is sufficient to move the piston 64. The line *b* indicates what the brake pressures would be for high push rod forces with the use of a common master cylinder and in the absence of the modulating apparatus of the present invention. The line *f* indicates the front wheel cylinder brake pressures produced by the device of the present invention and the line *r* indicates the rear wheel cylinder brake pressures produced by the device of the present invention after movement of the piston 64.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. Fluid motor means for use in a vehicular hydraulic brake system having front and rear brake cylinders and operator controlled actuating means, said fluid motor means including first and second fluid displacing members movable in response to said actuating means to displace fluid to said front and rear brake cylinders, means providing paths for the flow of brake fluid from said first fluid displacing means to said rear brake cylinders and from said second fluid displacing means to said front brake cylinders, a pressure modulating movable wall exposed to fluid from said first fluid displacing means on a first side thereof and exposed to fluid from said second fluid displacing means on a second opposite side thereof, the effective area of said wall exposed to pressure from said second fluid displacing means being less than the effective area of said wall exposed to pressure from said first fluid displacing means, yieldable means biasing said movable wall in a direction assisting the fluid exposed to said second side of said movable wall whereby said movable wall will move against the bias of said yieldable means upon the application of a predetermined braking force to increase the rate of pressurization of the front brake cylinders and decrease the rate of pressurization in the rear cylinders during continued brake application.

2. The structure set forth in claim 1 including means operable to maintain the pressures produced by said first and second fluid displacing means equal to one another during a preliminary portion of a brake application prior to the attainment of said predetermined force conditions.

3. Fluid motor means for use in a vehicle hydraulic brake system having operator-actuated means and front and rear brake cylinders, said fluid motor means including a first piston arranged to displace fluid to the rear brake cylinders, a second piston arranged to displace fluid to the front brake cylinders, means interconnecting said pistons for joint movement thereof, means defining a pair of interconnected bores in which said pistons are movable, unidirectional acting seal means associated with said second piston for the flow of fluid thereby from said first piston, a pressure modulating piston exposed to fluid from said first piston on a first side thereof and to fluid from said second piston on a second opposite side thereof, the effective area of said second opposite side being less than the effective area of said first side of said pressure modulating piston, yieldable means acting against said pressure modulating piston in a direction assisting the fluid pressure acting against said second opposite side thereof whereby fluid displaced by said first piston is free to flow into the bore in which said second piston operates when the fluid pressurized by said second piston is at a lower pressure than the fluid pressurized by said first piston and whereby fluid pressurized by said first piston will move said pressure modulating piston against the bias of said yieldable means when it attains a predetermined pressure level.

4. The structure set forth in claim 3 in which said yieldable means comprises a spring.

5. The structure set forth in claim 4 including a plunger connected to said pressure modulating piston and a seal surrounding said plunger and operable to insulate one end of said plunger from the fluid acting against said second opposite side of said pressure modulating piston.

6. The structure set forth in claim 5 including a fluid reservoir and passage means interconnecting the space on the opposite side of said seal from said pressure modulating piston with said reservoir.

7. A master cylinder for use in a vehicular hydraulic brake system having operator-actuated means and front and rear sets of brake cylinders, said master cylinder including a housing having coaxial interconnected first and second bores, a reservoir, a third bore connected to one end of said first bore at one end thereof and to the end of said second bore at the opposite end thereof, a first piston operable in said first bore, a second piston operable in said second bore, means interconnecting said first and second pistons for joint movement thereof, a third piston operable in said third bore, unidirectionally acting seal means associated with said second piston operable to admit fluid into said second bore from said first bore when the pressure in said first bore is higher than the pressure in said second bore, said third piston having a first area exposed to fluid from said first bore and a second smaller effective area opposed to said first area, means providing a path for the flow of fluid from said first bore to one of said sets of brake cylinders and means providing a path for the flow of fluid from said second bore to the other of said sets of brake cylinders, yieldable means biasing said third piston in a direction assisting the fluid pressure acting against said second effective area thereof whereby said third piston will remain in a given position until the pressure of fluid displaced by said first piston attains a predetermined level at which point said third piston will yield to increase the rate of pressurization of said one set of brake cylinders and to decrease the rate of pressurization of the other set of brake cylinders.

No references cited.

JULIUS E. WEST, *Primary Examiner.*